United States Patent [19]

Takahashi et al.

[11] Patent Number: 4,747,671
[45] Date of Patent: May 31, 1988

[54] FERROELECTRIC OPTICAL MODULATION DEVICE AND DRIVING METHOD THEREFOR WHEREIN ELECTRODE HAS DELAYING FUNCTION

[75] Inventors: Tohru Takahashi, Tokyo; Hiroshi Inoue, Yokohama; Yoshiyuki Osada, Atsugi; Yutaka Inaba, Kawaguchi; Junichiro Kanbe, Yokohama, all of Japan

[73] Assignee: Canon Kabushiki Kaisha, Tokyo, Japan

[21] Appl. No.: 931,082

[22] Filed: Nov. 17, 1986

[30] Foreign Application Priority Data

Nov. 19, 1985 [JP] Japan .................................. 60-260594

[51] Int. Cl.$^4$ .............................................. G02F 1/13
[52] U.S. Cl. .................................... 350/336; 350/333; 350/350 S
[58] Field of Search ...................... 350/333, 336, 350 S

[56] References Cited

U.S. PATENT DOCUMENTS

| | | | |
|---|---|---|---|
| 4,326,776 | 4/1982 | Banda | 350/336 |
| 4,335,937 | 6/1982 | Takamatsu et al. | 350/336 |
| 4,384,763 | 5/1983 | Russo | 350/336 X |
| 4,390,244 | 6/1983 | Hareng et al. | 350/336 X |
| 4,508,429 | 4/1985 | Nagae et al. | 350/350 S |
| 4,591,886 | 5/1986 | Umeda et al. | 350/350 S X |

Primary Examiner—Stanley D. Miller
Assistant Examiner—Richard F. Gallivan
Attorney, Agent, or Firm—Fitzpatrick, Cella, Harper & Scinto

[57] ABSTRACT

An optical modulation device is disclosed, which includes: a first substrate having thereon a signal transmission electrode connected to a signal source and a first electrode having a delay function connected to the transmission electrode; a second substrate having thereon a second electrode disposed opposite to said first electrode; and an optical modulation material, particularly a ferroelectric liquid crystal, disposed between the first and second electrodes. An optical modulation system, particularly a gradational display system, utilizing the delay function is also disclosed.

38 Claims, 6 Drawing Sheets

FERROELECTRIC OPTICAL MODULATION DEVICE AND DRIVING METHOD THEREFOR WHEREIN ELECTRODE HAS DELAYING FUNCTION

FIELD OF THE INVENTION AND RELATED ART

The present invention relates to an optical modulation device for a display panel and a driving method therefor, particularly an optical modulation device adapted to gradational or tonal display using a liquid crystal material, especially, a ferroelectric liquid crystal, and a driving method therefor.

In the conventional liquid crystal television panel of the active matrix driving system, thin film transistors (TFTs) are arranged in matrix corresponding to respective pixels. When a gate-on pulse is applied to a TFT to turn on the source-drain channel, a picture image signal is applied to the source and stored in a capacitor. A liquid crystal (e.g., TN (twisted nematic) liquid crystal) is driven by the stored image signal and a gradational display is effected by voltage modulation of pixels.

However, a television display panel of the active matrix driving system using a TN liquid crystal is a complicated TFT structure requiring a large number of production steps accompanied with a high production cost. Morever, there is a further problem that it is difficult to provide a large area of semiconductor film (e.g., of polysilicon, amorphous silicon) constituting TFTs.

On the other hand, a display panel of a passive matrix driving type using a TN liquid crystal has been known as one of a low production cost. However, in this type of liquid crystal display panel, when the number (N) of scanning lines is increased, a time period (duty factor) during which one selected point is subjected to an effective electric field during the time when one frame is scanned is decreased at a ratio of 1/N, whereby crosstalk occurs and a quality picture with high contrast cannot be obtained. Furthermore, as the duty factor is decreased, it is difficult to control gradation of respective pixels by means of voltage modulation so that this type of display is not adapted for a display panel of a high pixel or wiring density, particularly one for a liquid crystal television panel.

SUMMARY OF THE INVENTION

A principal object of the present invention is to solve the above problems.

A more specific object of the present invention is to provide an optical modulation device constituting a display panel of a high pixel density over a wide area and particularly suitable for a gradational display, and a driving method therefor.

More specifically, the present invention provides an optical modulation device, comprising: a first substrate having thereon a signal transmission electrode connected to a signal source and a first electrode having a delay function connected to the transmission electrode, a second substrate having thereon a second electrode disposed opposite to said first electrode, and an optical modulation material disposed between the first and second electrodes.

The present invention also provides a display system, particularly a gradational display system, using the above optical modulation device and utilizing the delay function.

These and other objects, features and advantages of the present invention will become more apparent upon a consideration of the following description of the preferred embodiments of the present invention in conjunction with the accompanying drawings.

DETAILED DESCRIPTION OF THE PREFERRED EMBODIMENTS

As an optical modulation material used in the driving method according to the present invention, a material which shows a first optically stable state (e.g., assumed to form a "bright" state) and a second optically stable state (e.g., assumed to form a "dark" state) depending on an electric field applied thereto, i.e., one showing at least two stable states in response to an electric field, particularly a liquid crystal showing such a property, may be used.

Preferable ferroelectric liquid crystals showing at least two stable states which can be used in the driving method according to the present invention are chiral smectic liquid crystals having ferroelectricity, among which liquid crystals showing chiral smectic C phase (SmC*), H phase (SmH*), I phase (SmI *), F phase (SmF*) or G phase (SmG*) are suitable. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcylidene-4'-octylaniline (MBRA 8), etc.

When a device is constituted using these materials, the device may be supported with a block of copper, etc., in which a heater is embedded in order to realize a temperature condition where the liquid crystal compounds assume an SmC*, SmH*, SmI*, SmF* or SmG* phase.

Figure 1:
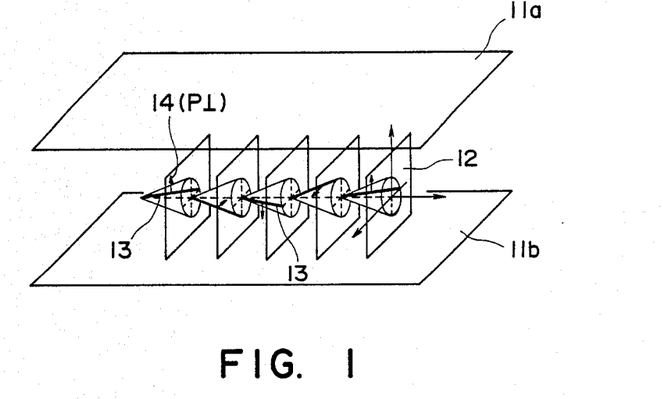
FIGS. 1 and 2 are schematic perspective views illustrating the operation principle of a ferroelectric liquid crystal device used in the present invention.
Figure 2:
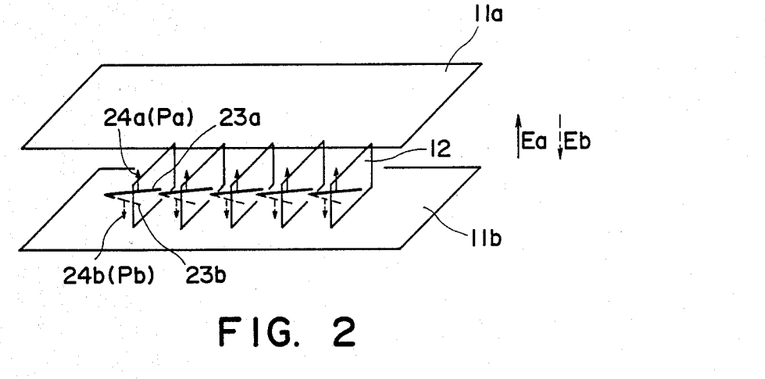

Referring to FIG. 1, there is schematically shown an example of a ferroelectric liquid crystal cell for explanation of the operation thereof. Reference numerals 11a and 11b denote base plates (glass plates) on which a transparent electrode of, e.g., $In_2O_3$, $SnO_2$, ITO (Indium-Tin-Oxide), etc., is disposed, respectively. A liquid crystal of, e.g., an SmC*-phase in which liquid crystal molecular layers 12 are oriented perpendicular to surfaces of the glass plates is hermetically disposed therebetween. Full lines 13 show liquid crystal molecules. Each liquid crystal molecule 13 has a dipole moment ($P_\perp$) 14 in a direction perpendicular to the axis thereof. When a voltage higher than a threshold level is applied between electrodes formed on the base plates 11a and 11b, a helical structure of the liquid crystal molecule 13 is unwound or released to change the alignment direction of respective liquid crystal molecules 13 so that the dipole moments ($P_\perp$) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., $1\mu$), the helical structure of the liquid crystal molecules is unwound even in the absence of an electric field whereby the dipole moment assumes either of the two states, i.e., Pa in an upper direction 23a or Pb in a lower direction 24a as shown in FIG. 2. When electric field Ea or Eb higher than a certain threshold level and different from each other in polarity as shown in FIG. 2 is applied to a cell having the above-mentioned characteristics, the dipole moment is directed either in the upper direction 24a or in the lower direction 24b depending on the vector of the electric field Ea or Eb. In correspondence with this, the liquid crystal molecules are oriented in either of a first stable state 23a (bright state) and a second stable state 23b (dark state).

When the above-mentioned ferroelectric liquid crystal is used as an optical modulation element, it is possible to obtain two advantages: (1) the response speed is quite fast and (2) the orientation of the liquid crystal shows bistability. The second advantage will be further explained, e.g., with reference to FIG. 2. When the electric field Ea is applied to the liquid crystal molecules, they are oriented in the first stable state 23a. This state is stably retained even if the electric field is removed. On the other hand, when the electric field Eb of which direction is opposite to that of the electric field Ea is applied thereto, the liquid crystal molecules are oriented to the second stable state 23b, whereby the directions of molecules are changed. This state is also stably retained even if the electric field is removed. Further, as long as the magnitude of the electric field Ea or Eb being applied is not above a threshold value, the liquid crystal molecules are placed in the respective orientation states. In order to effectively realize high response speed and bistability, it is preferable that the thickness of the cell is as thin as possible and generally 0.5 to $20\mu$, particularly 1 to $5\mu$. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

An embodiment of the display device according to the present invention will now be explained with reference to FIG. 3.

Figure 3:
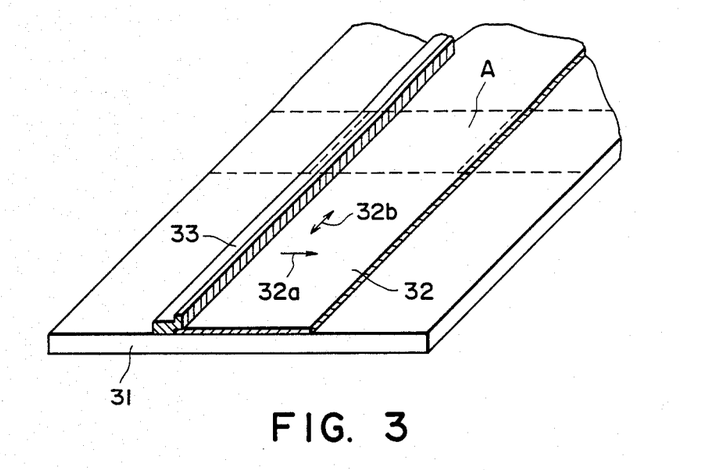
FIG. 3 is a partial perspective view of a substrate having a transmission electrode and a display electrode used in the present invention.

In FIG. 3, a glass substrate 31 has thereon an electrode 32 which has a delay function in the direction of an arrow 32a and constitutes one side of display electrode, and a transmission electrode 33. The display electrode 32 has a region A defining a pixel. Facing the display electrode 32, a counter electrode is disposed on the other substrate (not shown) at a region on the other substrate corresponding to region A. An optical modulation material is sandwiched between the display electrode and the counter electrode. The case where the resistivity of the counter electrode is sufficiently low is considered. The region A is assumed as one pixel which is square in shape. A signal which has been supplied through the transmission electrode 33 having a sufficiently low resistivity propagates through the electrode 32 in the direction of arrow 32a, and the propagation time is characterized by $R \times C$, wherein R denotes the sheet resistivity of the electrode 32 ($\Omega/\square$) and C denotes a capacitance formed by the display electrode and the counter electrode at the region A (F).

According to a device using such a combination of a transmission electrode and a display electrode having a delay function, the following two advantages are obtained.

(1) An electric signal supplied to a terminal of the transmission electrode (or display electrode) propagates through the transmission electrode at a high velocity and then through the display electrode having a delay function. As a result, disuniformity of electrical signal along the longitudinal direction of the display electrode denoted by 32b in FIG. 3 is extremely minimized, whereby the voltage applied to an optical modulation device is uniformized along this direction.

(2) By utilizing a voltage distribution or gradient in the direction 32b on the display electrode, and by applying a gradational signal modulated with respect to voltage, pulse duration or pulse number as an input signal, a gradational display may be effected.

The above point (2) will be explained in detail with reference to an example.

Referring to FIG. 3, an about 100 Å-thick semitransparent Ge layer was formed by sputtering on a glass substrate 31. The sheet resistivity of the layer was $5 \times 10^7 \Omega/\square$. The layer was patterned to form a display electrode 32 as shown in FIG. 3. The width of the display electrode in the direction of 32a was made $230\mu$ (while the width may be arbitrarily determined and generally suitably be in the range of $20\mu$ to $500\mu$. Then, Al was vapor-deposited under vacuum in a thickness of 1000 Å and again patterned to form a transmission electrode 33 as shown in FIG. 3. The Al layer formed in the above described manner provided a low resistivity of about $0.4 \Omega/\square$ and formed into a width of about $20\mu$. On the other hand, on the counter substrate, a transparent ITO (indium-tin-oxide) layer was formed as a counter electrode so as to cover the region A. The ITO layer showed a sheet resistivity of about $20 \Omega/\square$.

On the two substrates prepared in the above described manner, an about 500 Å-thick polyvinyl alcohol layer was formed and subjected to a rubbing treatment.

Then, the two substrates were disposed to face each other and secured to each other with a controlled gap of about $1\mu$ to form a cell, into which a ferroelectric liquid crystal composition consisting mainly of p-n-octyloxybenzoic acid-p'-(2-methylbutyloxy)phenyl-ester and p-n-nonyloxybenzoic acid-p'-(2-methylbutyloxy)phenyl-ester, was injected. The region A (as shown by A in FIG. 3) at which the display electrode and the counter electrode overlapped each other had a size of 230×230µ, and provided a capacitance of about 3 pF after the injection of the liquid crystal.

On both sides of the liquid crystal cell thus prepared, a pair of polarizers were disposed in the form of cross nicols, and the optical characteristics were observed.

Figure 4:
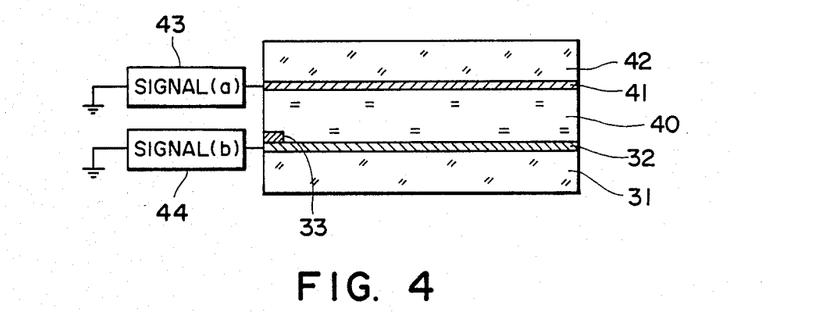
FIG. 4 is a schematic sectional view of an optical modulation device according to the present invention.
Figure 5:
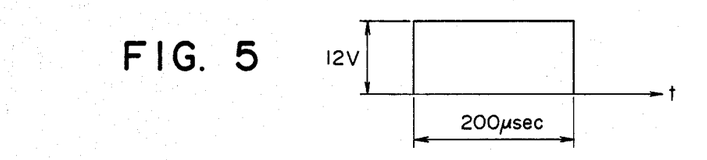
FIG. 5 shows an example of a scanning signal.
Figure 6A:
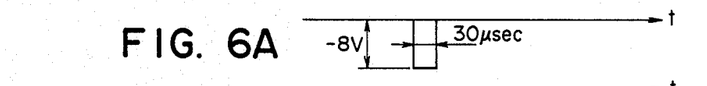
FIGS. 6A–6F show examples of gradation signals used in the present invention.
Figure 6B:
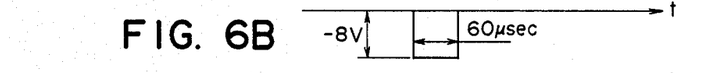
Figure 6C:
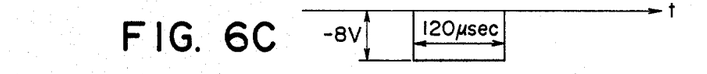
Figure 6D:
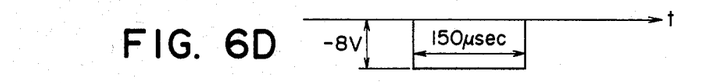
Figure 6E:
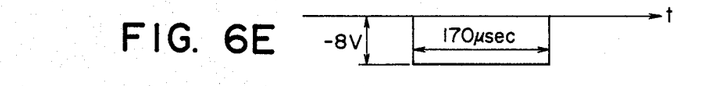
Figure 6F:
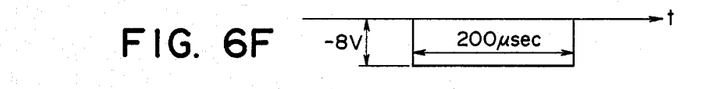

FIG. 4 schematically illustrates a method of applying electric signals to a liquid crystal cell which includes a counter electrode 41, a counter substrate 42, and a liquid crystal layer 44 disposed therebetween, and FIGS. 5 and 6A–6F show examples of electric signals applied. FIG. 5 shows a waveform of SIGNAL(a) shown applied through a driver circuit 43 in FIG. 4 and FIGS. 6A–6F show waveforms of SIGNAL(b) applied through a driver circuit 44 in FIG. 4. The voltage waveform effectively applied to the liquid crystal layer varies depending on a distance from the transmission electrode.

Now, a pulse of −12 V, 200 µsec as SIGNAL(a) and a pulse of 8 V, 200 µsec as SIGNAL(b) were applied in phase with each other in advance. These pulses are referred to as erasure pulses. Then, the liquid crystal was switched or brought to the first stable state shown in FIG. 1 or FIG. 2, thereby to render the whole pixel A "bright" as the polarizers were arranged in that manner. At this state, various pulses as shown in FIGS. 6A–6F were applied respectively in phase with the pulse shown in FIG. 5, whereby the pixel A provided optical states as shown in FIGS. 7A–7F.

Figure 7A:
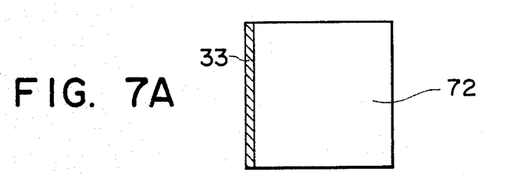
FIGS. 7A–7F show schematic sketches showing bright-to-dark gradational states of a pixel obtained correspondingly.
Figure 7B:
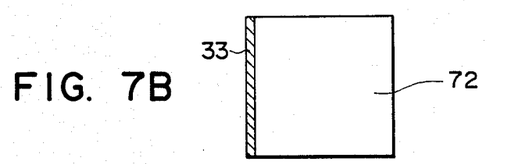
Figure 7C:
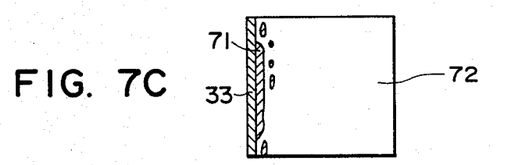
Figure 7D:
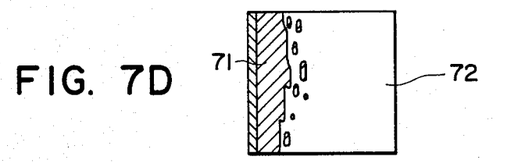
Figure 7E:
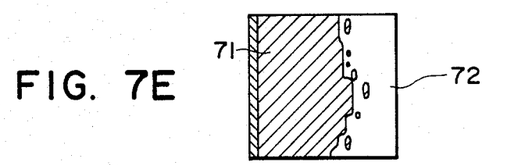
Figure 7F:
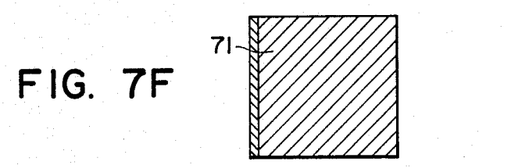

More specifically, for pulse durations of 30 µsec (corresponding to FIG. 6A) and 60 µsec (corr. to FIG. 6B), no change occurred from the bright state 72 (FIGS. 7A and 7B). For a pulse duration of 120 µsec (corr. to FIG. 6C), the portion of the liquid crystal close to the transmission electrode 33 was switched to the dark state 71 (FIG. 7C). Further, as the pulse duration was increased to 150 µsec (FIG. 6D) and 170 µsec (FIG. 6E), the region of the dark state 71 became wider (FIGS. 7D and 7E). Finally, when the pulse duration was 200 µsec (FIG. 6E), the whole pixel A was switched to the dark state (FIG. 7F). In this way, an image with gradation may be obtained.

In the above example, gradation signals applied were those having the same voltage and different pulse durations. Alternatively, gradation signals having the same pulse duration and different voltages or waveheights or intensities may also be used according to the principle of the present invention. The voltage values for this purpose may for example be selected at (A) −2 V, (B) −3 V, (C) −4 V, (D) −5 V, (E) −6 V and (F) −9 V, when the pulse duration is fixed, e.g., at 180 µsec. Further, it is also possible to effect a similar gradational display by selecting a particular pulse duration and modulating the number of pulses (or frequency) thereof.

Figure 8:
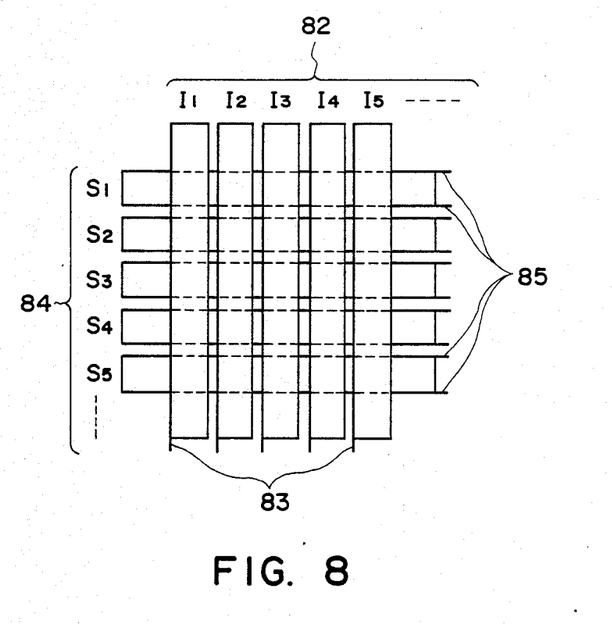
FIG. 8 is a schematic plan view showing a matrix electrode arrangement used in the present invention.
Figure 9A:
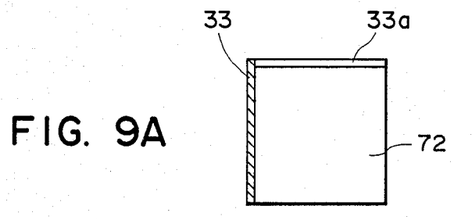
FIGS. 9A–9E are schematic sketches showing another set of bright-to-dark gradational states.
Figure 9B:
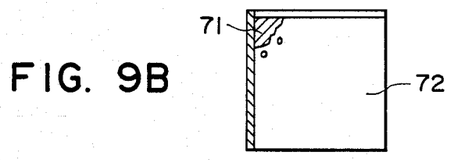
Figure 9C:
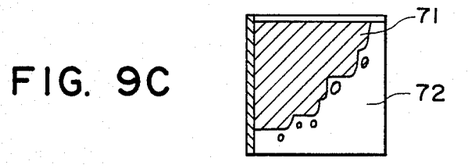
Figure 9D:
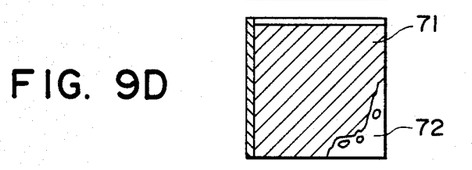
Figure 9E:
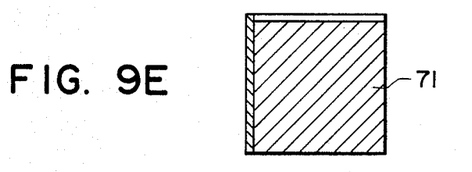

By the way, a display with a large number of pixels with a simple matrix electrode structure may be formed in a manner as illustrated by FIG. 8. Thus, the matrix electrode structure comprises signal (display electrodes) corresponding to pixel electrodes 82 ($I_1$, $I_2$, $I_3$, ...); transmission electrodes 83 each disposed along the pixel electrodes and receiving gradation signals corresponding to image signals; scanning electrodes 84 corresponding to the counter electrodes; and auxiliary conductors for preventing delay of electric signals in a direction along the longitudinal direction of the scanning electrodes.

Hereinbelow, the present invention will be explained more specifically based on an embodiment as shown in FIG. 8.

Electrodes or conductors having the following dimensions or particulars were disposed.

Scanning electrodes 84:
length: 210 mm,
pitch: 250 µm,
width: 230 82 m,
material: ITO (sheet resistivity: 20 Ω/□).
Auxiliary conductors 85: Al stripe
width: 20 µm×2,
thickness: 1000 Å (sheet resistivity: 0.4 Ω/□).
Signal (display) electrodes 82:
length: 298 mm,
pitch: 250 µm,
width: 230 µm,
material: Ge (germanium).
Transmission electrodes 83: Al stripe
width: 20 µm×1,
thickness: 1000 Å (sheet resistivity: 0.4 Ω/□
The following pulses were applied:
Scanning pulse (line-by-line driving):
voltage: +12 V
duration: 200 µsec.
Gradation signal pulse:
voltage: −9 V to +9 V (5 gradation steps)
duration: 200 µsec.
The liquid crystal material used was a ferroelectric liquid crystal composition consisting mainly of p-n-octyloxybenzoic acid-p'-(2-methylbutyloxy)-phenyl ester and p-n-nonyloxybenzoic acid-p'-(2-methylbutyloxy)phenyl ester and was used in a layer with a thickness of about 1 µm.

In the present invention, the transmission electrode may comprise a film of a metal such as gold, copper, silver or chromium instead of an aluminum film. It is generally preferred that the transmission electrode has a sheet resistivity (as measured according to ASTM D257 with respect to film having a sufficient area separately prepared under the same film forming conditions) of $10^2$ Ω/□ or below. Further, the display electrode may be a film of a metalloid such as Ge, GeTe alloy, GeSe alloy etc., or a film of a metal oxide such as $SnO_2$. The ratio of the sheet resistivity of the display electrode to that of the transmission electrode should preferably be larger than 1.5.

In the present invention, the resistivity of the pixel electrode and the resistivity of the transmission electrode are required to be set to appropriate values so as not to provide a fluctuation in voltage applied to the liquid crystal layer in the lengthwise direction of the pixel electrode but to provide an effective gradation effect in the transverse direction of the pixel electrode. The condition for this purpose is set forth as follows:

$$r_1 C_t < r_2 C_e \tag{1}$$

wherein $r_1$ denotes the resistance of the transmission electrode as viewed from the signal source (Ω); $C_t$ denotes the total capacitance corresponding to all the pixel electrodes connected to the transmission electrode (F); and $r_2$ and $C_e$ denote the resistance and the capacitance, respectively, of a pixel electrode corresponding to one pixel as viewed from the transmission electrode (Ω).

The respective values were confirmed with respect to the example based on FIG. 7 as follows:

$r_1 \approx 0.4 \times (298 \times 10^3)/20 \approx 6 \times 10^3 \Omega$
$C_t \approx 3nF$,
$r_2 \approx 5 \times 10^7 \Omega$
$C_e \approx 3pF$.

From the above, the following values were obtained:
$r_1 C_t \approx 18$ μsec, and
$r_2 C_e \approx 150$ μsec.

Thus, condition (1) is satisfied.

In the above example, a gradational display was realized by using a sufficiently low resistivity of an electrode to which a scanning signal is applied and a high resistivity of a display electrode on a line to which an information signal is applied. However, by applying the principle of the present invention as it is, a similar gradational display effect as obtained in the example can be obtained by providing a delay function or effect to an electrode to which a scanning signal is applied and providing a sufficiently low resistivity to an electrode to which an information signal is applied. More specifically, the liquid crystal cell having the matrix structure used in the above example was driven by exchanging the roles of the scanning electrodes and signal electrodes, whereby very good gradational expression can also be attained.

FIGS. 9A–9E illustrate another embodiment of application with gradational display states obtained thereby. More specifically, in the embodiment, both the scanning electrodes and the signal electrodes are constituted to comprise combinations of transmission electrodes 33 (on signal electrode side) or 33a (on counter electrode side) and related electrodes connected to the transmission electrodes.

As described above, according to the present invention, the following effects are attained.

(1) An electric signal supplied to a terminal of a transmission electrode (or display electrode) propagates through the transmission electrode at a high velocity and then through the display electrode having a delay function. As a result, disuniformity of electrical signal along the longitudinal direction of the display electrode is extremely minimized, whereby the voltage applied to an optical modulation device is uniformized along this direction.

(2) By utilizing a voltage distribution or gradient on the display electrode, and by applying a gradational signal modulated with respect to voltage, pulse duration, or pulse number as an input signal, a gradational display may be effected.

What is claimed is:

1. An optical modulation device, comprising:
    a first substrate having thereon a signal transmission electrode connected to a signal source and a first electrode having a delay function connected to the transmission electrode,
    a second substrate having thereon a second electrode disposed opposite to said first electrode, and
    an optical modulation material disposed between the first and second electrodes.

2. An optical modulation device according to claim 1, wherein said first electrode and said second electrode are respectively disposed in a plurality, and the resultant plurality of first electrodes and the plurality of second electrodes are disposed to intersect with each other so that each intersection region defines a pixel.

3. An optical modulation device according to claim 2, wherein the transmission electrode has a resistance $r_1$ as viewed from the signal source, the first electrode connected to the transmission electrode provides a capacitance $C_t$, a portion of the first electrode constituting one pixel has a resistance $r_2$ as viewed from the transmission electrode, and one pixel provides a capacitance $C_e$; the thus defined values satisfying the relationship of:

$$r_1 C_t < r_2 C_e$$

4. An optical modulation device according to claim 1, wherein the transmission electrode has a sheet resistivity of $10^2 \Omega/\square$ or lower.

5. An optical modulation device according to claim 1, wherein said first electrode has a sheet resistivity of $10^2 - 10^9 \ \Omega/\square$.

6. An optical modulation device according to claim 1, wherein said first electrode is formed of a film of a metalloid or a metal oxide.

7. An optical modulation device according to claim 1, wherein said optical modulation material is a ferroelectric liquid crystal.

8. An optical modulation device according to claim 7, wherein said ferroelectric liquid crystal is a chiral smectic liquid crystal.

9. An optical modulation device according to claim 8, wherein said chiral smectic liquid crystal is a chiral smectic C or H liquid crystal.

10. An optical modulation device according to claim 8, wherein said chiral smectic liquid crystal is formed in a layer thin enough to release the helical structure of said chiral smectic liquid crystal.

11. An optical modulation device according to claim 1, wherein said information signal source is an information signal source.

12. An optical modulation device according to claim 11, wherein said information signal source comprises means for supplying an information signal having a pulse duration corresponding to given gradation data to said transmission electrode.

13. An optical modulation device according to claim 11, wherein said information signal source comprises means for supplying an information signal having a waveheight corresponding to given gradation data to said transmission electrode.

14. An optical modulation device according to claim 11, wherein said information signal source comprises means for supplying an information signal having a number of pulses corresponding to given gradation data to said transmission electrode.

15. An optical modulation device according to claim 1, wherein said signal source is a scanning signal source.

16. An optical modulation device, comprising:
    a first substrate having thereon a first signal transmission electrode connected to an information signal source and a first electrode having a delay function connected to the transmission electrode,
    a second substrate having thereon a second signal transmission electrode connected to a scanning signal source, and a second electrode having a delay function disposed opposite to said first electrode and connected to the second signal transmission electrode, and
    an optical modulation material disposed between the first and second electrodes.

17. An optical modulation device according to claim 16, wherein the first and second signal transmission electrodes have a sheet resistivity of $10^2 \ \Omega/\square$ or lower.

18. An optical modulation device according to claim 16, wherein said first electrode has a sheet resistivity of $10^2 - 10^9$ $\Omega/\square$.

19. An optical modulation device according to claim 16, wherein said first and second electrodes are formed of a film of a metalloid or a metal oxide.

20. An optical modulation device according to claim 16, wherein said optical modulation material is a ferroelectric liquid crystal.

21. An optical modulation device according to claim 20, wherein said ferroelectric liquid crystal is a chiral smectic liquid crystal.

22. An optical modulation device according to claim 21, wherein said chiral smectic liquid crystal is a chiral smectic C or H liquid crystal.

23. An optical modulation device according to claim 21, wherein said chiral smectic liquid crystal is formed in a layer thin enough to release the helical structure of said chiral smectic liquid crystal.

24. An optical modulation device according to claim 16, wherein said information signal source comprises means for supplying an information signal having a pulse duration corresponding to given gradation data to said transmission electrode.

25. An optical modulation device according to claim 16, wherein said information signal source comprises means for supplying an information signal having a waveheight corresponding to given gradation data to said transmission electrode.

26. An optical modulation device according to claim 16, wherein said information signal source comprises means for supplying an information signal having a number of pulses corresponding to given gradation data to said transmission electrode.

27. A driving method for an optical modulation device of the type comprising: a first substrate having thereon a signal transmission electrode connected to a signal source and a first electrode having a delay function connected to the transmission electrode, a second substrate having thereon a second electrode disposed opposite to said first electrode, and an optical modulation material disposed between the first and second electrodes; said driving method comprising applying an information signal to the signal transmission electrode.

28. A driving method according to claim 27, wherein said information signal is a gradation signal comprising a voltage magnitude-modulation pulse signal.

29. A driving method according to claim 27, wherein said information signal is a gradation signal comprising a pulse duration-modulation signal.

30. A driving method according to claim 27, wherein said information signal is a gradation signal comprising a pulse number-modulation signal.

31. A driving method according to claim 27, wherein said first electrode and said second electrode are respectively disposed in a plurality, and the resultant plurality of first electrodes and the plurality of second electrodes are disposed to intersect with each other so that each intersection region defines a pixel.

32. A driving method according to claim 31, wherein an information signal is selectively applied to the plurality of first electrodes, and a scanning signal is applied to the plurality of second electrodes line-by-line, thereby to provide a display.

33. A driving method according to claim 31, wherein a scanning signal is applied to the plurality of first electrodes line-by-line, and an information signal is selectively applied to the plurality of second electrodes, thereby to provide a display.

34. A driving method according to claim 27, wherein said optical modulation material is a ferroelectric liquid crystal.

35. A driving method according to claim 27, wherein said second electrode comprises a combination of a signal transmission electrode connected to a signal source and an electrode having a delay function connected to the transmission electrode.

36. A driving method according to claim 27, wherein the transmission electrode has a sheet resistivity of $10^2$ $\Omega/\square$ or lower.

37. A driving method according to claim 27, wherein said first electrode has a sheet resistivity of $10^2 - 10^9$ $\Omega/\square$.

38. A driving method according to claim 37, wherein said first electrode is formed of a film of a metalloid or a metal oxide.

* * * * *

UNITED STATES PATENT AND TRADEMARK OFFICE
CERTIFICATE OF CORRECTION

PATENT NO. : 4,747,671
DATED : May 31, 1988
INVENTOR(S) : TOHRU TAKAHASHI, ET AL.

It is certified that error appears in the above-identified patent and that said Letters Patent is hereby corrected as shown below:

COLUMN 4

Line 51, "500μ." should read --500μ).--
    Line 58, "ent ITO (indium-tin-oxide) layer" should read --ent layer of ITO (indium-tin-oxide)--.

COLUMN 6

Line 11, "width:  230 82m," should read --width:  230μm,--.
    Line 23, "0.4 Ω/□" should read --0.4 Ω/□).--.

COLUMN 8

Line 33, "said information signal source" should read --said signal source--.

COLUMN 10

Line 42, "claim 37," should read --claim 27,--.

Signed and Sealed this

Twenty-seventh Day of December, 1988

Attest:

DONALD J. QUIGG

Attesting Officer    Commissioner of Patents and Trademarks